United States Patent [19]

Swygert, Jr.

[11] 4,151,519
[45] Apr. 24, 1979

[54] PROTECTIVE CIRCUIT FOR COMPASS REPEATER AMPLIFIER SYSTEMS

[75] Inventor: Wilbert E. Swygert, Jr., Charlottesville, Va.

[73] Assignee: Sperry Rand Corporation, New York, N.Y.

[21] Appl. No.: 828,794

[22] Filed: Aug. 29, 1977

[51] Int. Cl.² ............................................. G08B 23/00
[52] U.S. Cl. ...................................... 340/517; 33/321; 73/178 R; 340/651; 340/664; 318/563
[58] Field of Search .............. 340/521, 522, 650, 651, 340/660, 662, 664; 33/317 R, 321; 73/178 R; 244/79; 318/563

[56] References Cited

U.S. PATENT DOCUMENTS

| | | |
|---|---|---|
| 2,459,239 | 1/1949 | Payne ........................... 340/651 X |
| 2,943,303 | 6/1960 | Barber ............................... 340/517 |
| 3,024,451 | 3/1962 | Potter ............................ 340/664 X |
| 3,401,549 | 9/1968 | Miller .............................. 33/321 X |
| 3,403,874 | 10/1968 | Boskovich et al. ............... 33/321 X |
| 3,482,231 | 12/1969 | Florek et al. .................... 340/662 X |
| 3,492,735 | 2/1970 | Burdick et al. ...................... 33/321 |
| 3,509,765 | 5/1970 | Stevenson, Jr. et al. .......... 33/321 X |
| 3,764,855 | 10/1973 | Beachley ........................ 340/650 X |
| 3,813,667 | 5/1974 | Smith .............................. 340/662 X |
| 4,053,876 | 10/1977 | Taylor ............................ 340/664 X |

Primary Examiner—John W. Caldwell, Sr.
Assistant Examiner—Daniel Myer
Attorney, Agent, or Firm—Howard P. Terry

[57] ABSTRACT

Gyrocompass heading step-by-step repeater amplifier channels are provided with protection from damage by accidental short-circuits occurring in one or more compass step-by-step data repeaters or in the cables extending to such repeaters. Total shut-down of the affected channel or channels is effected by fast-acting thyristor pulse control circuits and the channels are automatically reset when the fault is removed. A cooperative latching short-circuit alarm is provided.

9 Claims, 2 Drawing Figures

PROTECTIVE CIRCUIT FOR COMPASS REPEATER AMPLIFIER SYSTEMS

BACKGROUND OF THE INVENTION

1. Field of the Invention

The present invention relates generally to the art of gyrocompasses and more particularly to remotely located heading display repeater devices operated from a gyrocompass step-by-step data transmitter.

2. Description of the Prior Art

Prior art step-by-step heading repeater devices utilize analog data receivers in which a repeater motor mechanically drives an indicating compass card through gearing corresponding to that present in the step-by-step transmitter. Craft heading in degrees is obtained from an angularly calibrated scale printed on the rotatable compass card by observations with respect to a lubber line marked on the stationary frame of the repeater. Several such repeaters may be disposed conveniently about the craft for navigation and other purposes.

The repeater-driving electrical signals of the data transmitter are step-by-step data outputs that are normally applied through amplifier channels to three pairs of field poles in the repeater motor. In a typical step-by-step transmitter, which is mounted on the conventional lubber ring of the gyrocompass, there are brushes that roll over commutation segments and which, when electrical contact is made, supply current to respective pairs of poles of the compass repeater motor. The soft iron armature of the repeater motor then orients itself between one pair of its poles, then half way between that pair and the next, and so on. This angular stepping of the repeater motor armature turns the compass card, thereby incrementally following the gyrocompass heading. The invention is not limited to use with such data transmitters and may be used, for example, with known data transmitters employing light emitting diodes, photoresistors, and a rotatable vaned shutter.

Because of the generally hostile nature of shipboard environments and of the susceptibility of semiconductor elements to overload damage, short-circuit protection of the repeater channels is required in the interest of achieving acceptable reliability. Prior practice has seen general use of various current-limiting techniques for this protection, but with the achievement of only limited reliability. Automatic reset is not feasible and fuses or circuit breakers are normally required. Momentary or intermittent fault conditions are not detected and, even if detected, are difficult to locate. As the power output level of the amplifier channels is desirably increased for operating pluralities of repeaters, the current-limiter technique becomes increasingly undesirable. In particular, the problem with the prior art current limiting technique lies in the level of power dissipation in the output semiconductor devices. At higher power levels, the failure rates of these devices become excessive in the current-limiting mode due to junction over-temperature. The present invention overcomes this problem by limiting the durations of such power dissipation to very short time periods.

SUMMARY OF THE INVENTION

According to the present invention, gyrocompass step-by-step repeater amplifier channels are provided with reliable protection from damage by accidental short circuits occurring in loads including one or more compass step-by-step data repeaters. Total shut-down of the affected repeater amplifier is accomplished in the presence of shorting faults, whether permanent or intermittent, by a fast switching thyristor control circuit. The shut down channel is automatically reset if the fault is momentarily cleared upon the next movement of the step-by-step transmitter consequent of turning of the craft. A latching short-circuit alarm cooperates with the thyristor circuit and is provided as an aid to the detection of momentary or intermittent faults and for the detection, location, and repair of faults. The generally unsatisfactory features of current-limiting and other prior techniques are avoided, such as are fuses or circuit breakers.

DESCRIPTION OF THE PREFERRED EMBODIMENTS

Figure 1A:
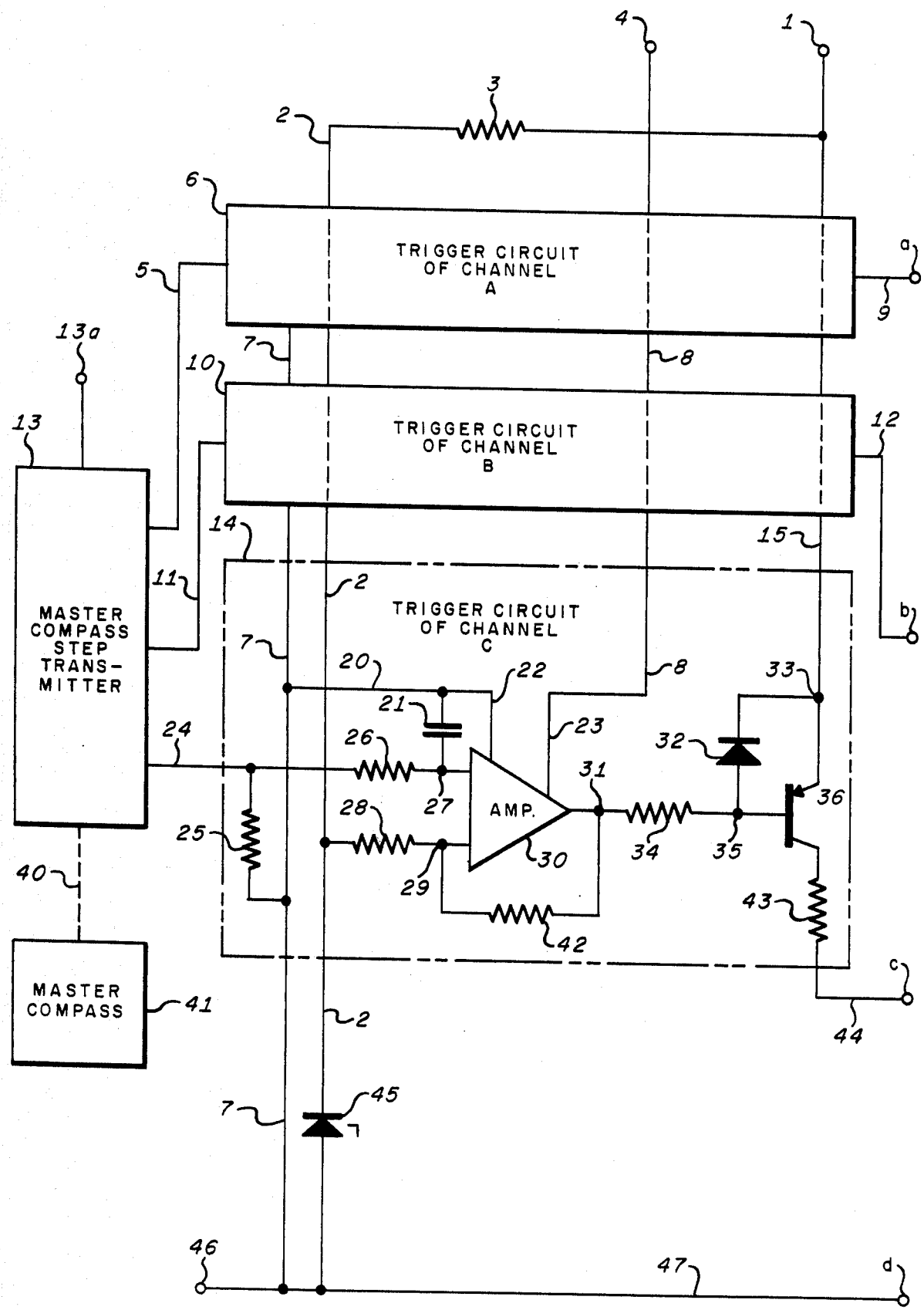
FIGS. 1A and 1B provide a wiring diagram of the invention showing its electrical components and their interconnections.
Figure 1B:
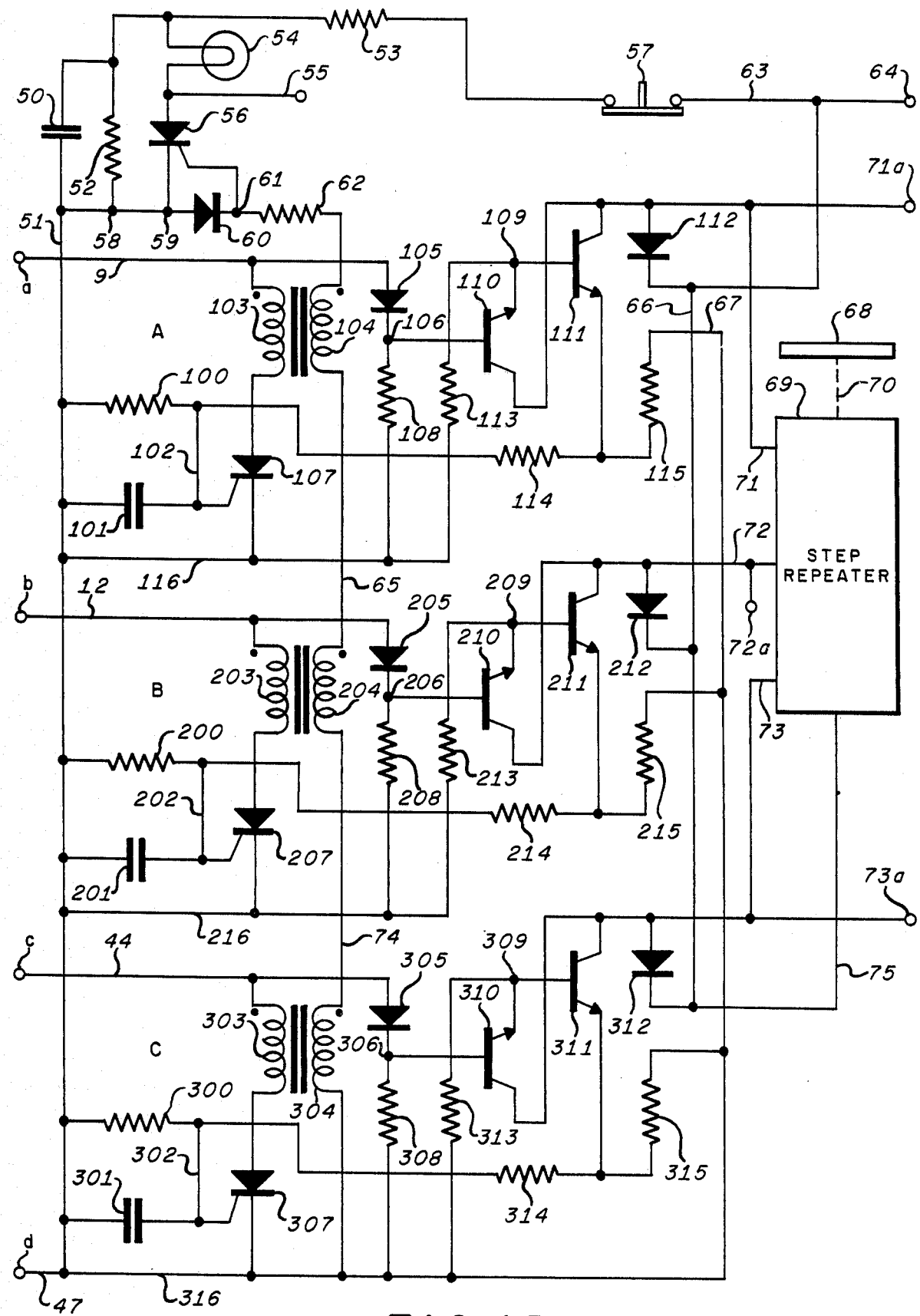

In the embodiment of the invention illustrated in FIGS. 1A and 1B, the three individual command signals separately present on the respective output leads, 5, 11 and 24 of the step transmitter 13 are respectively supplied through similar protected amplifier channels A, B and C to the input leads 71, 72, 73 of the remotely located step repeater 69 or to several such repeaters coupled in the usual parallel relation. Additional circuit elements for providing isolation between step repeater 69 and other similar repeaters, such as may be coupled to leads 71a, 72a, 73a, may be provided in the usual manner. Each channel includes similar novel sensing and protecting circuits which cooperate with a common alarm and reset mechanism shown at the top of FIG. 1B. All of the amplifier channels A, B and C share common power supplies and are operated in an identical manner with output power levels, for example, of about 100 watts.

As is conventional practice, the compass transmitter produces three phase-displaced pulse trains as the craft rotates with respect to the compass. As the compass heading changes, a train of voltage pulses thus appears at each output terminal. The pulse level at one terminal is high throughout a 0.5° variation in compass heading and the inter-pulse interval is equal to the pulse interval. Thus, for example, a high signal will appear at one output lead while the compass heading moves between 0° and 0.5°, whereas as low (or zero) output signal appears at that output lead when the compass heading is moving between 0.5° and 1.0°. The pulse trains on the three output terminals are similar, but are relatively phase displaced and overlap in the conventional manner. Thus, as in the prior art, six combinations of high and low signals are found on leads 5, 11, 24 as the compass itself rotates through 1.0°. Thus, the compass heading can be displayed by the step receiver in increments of a sixth of a degree as the craft continues to turn.

Since trigger circuits 6, 10 and 14 of the three respective data transmitting channels supplying outputs on leads 9, 12 and 44 are substantial duplicates, only the trigger circuit 14 is selected arbitrarily for discussion. For example, the command signal output lead 24 of step transmitter 13 is coupled to one signal input of a conventional operational amplifier 30 through input resistor 26 and junction 27, lead 24 also being coupled through resistor 25 to bus conductor 7. Junction 27 is coupled through capacitor 21 to lead 20 and thence also to bus conductor 7, lead 20 also supplying a reference voltage via lead 22 to a first reference voltage input of operational amplifier 30.

The second signal input to operational amplifier 30 is supplied from bus conductor 2 through resistor 28 and junction 29, the output junction 31 of amplifier 30 being connected through resistor 42 to junction 29. Bus conductor 8 supplies a second reference voltage to a second reference voltage input lead 23 of amplifier 30. The output of operational amplifier 30, which in the described configuration functions as a regenerative comparator such as the conventional Schmitt trigger circuit, has its output terminal 31 coupled through resistor 34 and junction 35 to the base of a conventional transistor 36 whose emitter is coupled through junction 33 to bus conductor 15. Junctions 33, 35 are coupled together by diode 32, poled as shown in the drawing. For providing a useful output, the collector of transistor 36 is coupled through resistor 43 to output lead 44, so that trigger circuit 14, in essence, provides an amplified and isolated version of its input on output lead 44. Trigger circuits 6 and 10 are similar, and are connected in a similar way to bus conductors 2, 7, 8 and 15. Bus conductor 15 is directly coupled to terminal 1 and is coupled through resistor 3 to bus conductor 2. Bus connector 2 is also connected through Zener diode 45, poled as shown, to bus conductor 47 and thus to terminal 46; bus conductor 7 is directly connected to terminal 46. Bus 47 acts as a common negative return for all direct current circuits via terminal 46 to the power source negative terminal. Terminal 1 is connected to a positive unidirectional power source (not shown) delivering 12 volts, for example, while terminal 4 is supplied with a positive unidirectional level of 24 volts, for example. It will be understood by those skilled in the art that the several bus conductors 2, 7, 8 and 15 are connected and used cooperatively in trigger circuits 6 and 10 just as they are in trigger circuit 14, as will be further described.

Referring to the lower position of FIG. 1B, the negative common bus conductor 47 again appears coupled to lead 316, while the output lead 44 of transistor 36 is coupled, as will be further described, to the base of a transistor 310 whose emitter is coupled at junction 309 through resistor 313 and lead 316 to bus conductor 47 and directly to the base of transistor 311. The collectors of transistors 310, 311 are connected together and to the input lead 73 of step repeater 69. The emitter of transistor 311 is coupled to a junction in the voltage divider-current sensing network comprising resistors 300, 314 and 315.

As was previously noted, the command signals on each of the output leads 5, 11, 24 of step transmitter 13 may be high or low in magnitude in various combinations depending upon the position of the compass input shaft 40. Considering the command voltage level on output lead 24 when this level is indeed low, the output at 31 of the trigger circuit 14 associated with operational amplifier 30 will be high. Accordingly, transistor 36 will be biased to its non-conducting state and there is no current flow via lead 44 so that power output transistor amplifiers 310, 311 also remain non-conducting. Under such conditions, no power is delivered to the associated winding of step repeater 69, whose winding mid-point is coupled to a suitable positive voltage supply via bus conductors 75 and 76 to terminal 64, as will be further described.

Conversely, when the input command signal at lead 24 applied to operational amplifier 30 is high, transistor 36 is biased into its conducting state, whereupon power output transistors 310, 311 are immediately placed in their fully-conducting or saturated state. Under this condition, full power is delivered to the associated winding of the step repeater 69 for rotating the repeater shaft 70 and dial 68. In normal operation in the absence of disturbances, the input commands on leads 5, 11, 24 from the master compass step transmitter 13 appear in their high states in a prescribed sequence when azimuth motion of compass 41 and shaft 40 is present, causing power to be applied in the same predetermined sequence to the individual step repeater windings which, in turn, causes repeater compass shaft 70 and dial 68 to follow master compass 41.

Referring to the lower section of FIG. 1B, a typical one of the three protective circuits will now be discussed with respect to that associated with power output transistors 310, 311. Since those associated with power output transistors 110, 111 and 210, 211 are similar to the protective circuit associated with power amplifiers 310, 311, only the latter need be discussed in detail. Accordingly, lead 44 from the output of transistor 36 is coupled through diode 305 to the base of transistor 310, as before. Lead 316 again serves as the common negative bus conductor. The voltage divider-current sensing network consisting of resistors 300, 314, 315 has its ends coupled to bus conductors 47 and 316. Capacitor 301 is coupled between bus conductor 47 via lead 302 and the junction between resistors 300 and 314. A thyristor 307 is coupled in series with a first winding 303 of a pulse transformer between leads 44, 316, the junction between resistors 300, 314 also being coupled to the gate control electrode of thyristor 307. The second winding 304 of the pulse transformer is coupled to lead 316 and the conductor 74 leading into the protective circuits for the remaining two channels of the data transmission system.

As previously described, the power output transistors 310, 311 respond to signals passing on lead 44 through diode 305 and junction 306 leading to the base of transistor 310. Junction 306 is also coupled to lead 316 via resistor 308. The collectors of power output transistors 310 and 311 are coupled through diode 312, poled as shown in the drawing, and bus conductor 66 to the terminal 64 of a suitable positive power source of 70 volts, for example. The collectors of power output transistors 310 and 311 are also coupled to the input lead 73 of step repeater 69.

In FIG. 1B, the three similar channels fed by the respective input leads 9, 12, 44 have corresponding parts with similar reference numerals 100 through 116 for the uppermost channel A, 200 through 216 for the middle channel B, and 300 through 316 for the lower channel C. They are substantially similar except that the secondary windings 104, 204, 304 of the pulse transformers are connected in series between lead 316 and a load resistor 62 of the alarm circuit at the top of the figure with no intervening connections.

The vertically directed bus conductor 51 of FIG. 1B connects to analogous elements 100, 101, 116 of channel A, 200, 201, 216 of channel B, and to 300, 301, 316 of channel C. Lead 316 is similarly connected by the vertically directed bus conductor 67 to the analogous current sensing resistors 115, 215, 315, of the three channels, while the analogous diodes 112, 212, 312 are all coupled via bus conductor 66 to the power supply at terminal 64.

In the common alarm circuit, the series outputs of the pulse transformer secondaries 104, 204, 304 are coupled through load resistor 62 and junction 61 to the gate electrode of thyristor 56 and also via diode 60, poled as shown, and junctions 59 and 58 to bus conductor 51. Capacitor 50 and resistor 52 are disposed in parallel between junction 58 and are coupled in series through resistor 53, reset switch 57, and lead 63 to power source terminal 64. Connected in parallel across resistor 52 is an alarm indicating lamp or other alarm device 54 and a thyristor 56, the gate control electrode of thyristor 56 being coupled to junction 61. Additional alarm devices may be coupled at the terminal of lead 55.

In channel C, the circuit elements that provide short-circuit protection are particularly thyristor 307, pulse transformer 303, 304, diode 305, resistors 314 and 300, capacitor 301, and resistor 315. These elements are coupled through lead 74, secondary winding 204, lead 65, and secondary 104 to the common alarm circuit.

Recalling to mind the previously described operation of the novel protective circuit in the absence of a short circuit, assume that a winding of the step repeater develops a short circuit to ground or to a second winding thereof, or that such short circuits appear in more than one repeater. If the disturbing short circuit develops while the input command signal to channel C on lead 44 is low, then no fault current can flow because power output transistors 310, 311 are both in their non-conducting states. If the short circuit develops, on the other hand, when the input command signal on lead 44 is high, the power output transistors 310, 311 are found in their fully conducting states and they would be totally destroyed if the fault current were not instantaneously removed. Of course, the destructive condition would also prevail if the short developed with the input command low and it then changed to high.

In any case of a cable or step repeater winding short, the novel protective circuit operates to check the fault current. As the fault current increases, a voltage proportional to the fault current is generated across the sensing resistor 315 of the network 300, 314, 315, the sensed voltage being coupled into the resistor pair 300, 314 whose common junction is coupled via lead 302 to the gate electrode of the normally non-conducting thyristor 307. As the fault current continues to rise, so also does the voltage applied to the gate electrode of thyristor 307; the threshold point is rapidly reached at which thyristor 307 abruptly switches into its fully conducting state. The resistor network is chosen according to well known techniques so that the thyristor threshold point is selected to correspond to a peak value of fault current well within the ratings of the power output transistors 310, 311, but also well above the load current normally supplied to step repeater 69.

Upon reaching the predetermined threshold level, thyristor 307 changes state and latches in its conducting state. The anode of diode 305 is immediately clamped to the voltage level of the d.c. common bus 47 by way of the primary 303 of pulse transformer 303, 304, whereby power output transistors 310, 311 are switched to their non-conducting states, being latched there. The action of the protective circuit is extremely fast; for example, a typical fault current of 12 amperes peak will have a duration of only 60 microseconds.

After thyristor 307 has latched in its conducting state, the channel C output on lead 73 remains shut off due to clamping action until its input command on lead 44 changes from high to low. When this transition occurs, the holding current for thyristor 307 is removed, allowing thyristor 307 to recover to its non-conducting state. Power output transistors 310, 311 then inherently remain non-conducting under these conditions because of the normal operation of the circuit.

In this manner, the automatic reset feature of the invention is afforded after any transient short circuit ends. Thus, whenever the fault condition is removed or otherwise disappears, only one transition of the input command signal on lead 44 from its high to its low condition is required to restore normal operation of the data transmission system. For the case in which the input command signal on lead 44 changes from the low to high with the short circuit condition already present, the novel protective circuit operates as described in the foregoing. Diode 305 is placed in series with the base of power output transistor 311 to insure that the clamping voltage developed by thyristor 307 does not exceed the sum of the allowable base-to-emitter junction voltages for power output transistors 310, 311. Capacitor 301 provides a small amount of filtering so that noise impulses do not cause false operation of thyristor 307.

In the operation of the common alarm circuit at the top of FIG. 1B when thyristor 307 is switched to its conducting state under fault conditions, pulse transformer 303, 304 acts like a differentiating circuit, so that a sharp voltage pulse is developed across its secondary winding 304. This pulse is coupled through leads 74, 65 and resistor 62 to the gate control electrode of thyristor 56, triggering the normally non-conducting thyristor 56 into its fully conducting state where it automatically latches, thus causing alarm lamp 54 to be continuously illuminated. Alarm lamp 54 must then remain illuminated until manually reset by switch 57 which, when opened, removes the necessary holding current from thyristor 56, allowing it to recover to its normal non-conducting state and extinguishing lamp 54. The alarm thyristor 56 is triggered into its conducting state and alarm lamp 54 is illuminated when any one or more of the protective circuits of channels A, B, or C operate because the three pulse-transformer secondaries 104, 204, 304 are connected in series. In the alarm circuit, resistors 52, 53 simply establish the proper level of the voltage across lamp 54, while capacitor 50 provides adequate filtering for preventing false operation of thyristor 56 and of alarm lamp 54 by transient noise impulses. Resistor 62 limits the current supplied to the gate control electrode of thyristor 56 to an acceptable value.

Accordingly, it is seen that the invention is an improved gyrocompass step-by-step data transmission system in which the data amplifier channels are provided with reliable protection from damage due to accidental short circuits occurring in step-by-step compass repeaters or in the associated ship's wiring. Total and fast shut-down of the faulted channel is accomplished in the presence of permanent or intermittent faults by a fast-switching thyristor control circuit. A latching short-circuit alarm is provided as an aid to detection and repair of the fault condition. The defects of the prior art are overcome, since current limiting techniques, fuses, or circuit breakers are avoided. The invention, unlike prior art approaches, lends itself to use in higher power repeater amplifier channels.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. In a step-by-step angle data repeater system including transmitter means having plural output means providing phase-displaced multiple-wire step data voltages indicative of angle, cooperating step-by-step receiver means for repeating said angle and having corresponding plural input means, and plural data processing channels for coupling said respective plural output means to corresponding ones of said plural input means, the improvement wherein each said data processing channel comprises:
   trigger circuit means responsive to the presence of a high or a low output voltage level at a first of said plural output means,
   first diode means coupled in series with the output of said trigger circuit means,
   amplifier means coupled to said first diode means for supplying corresponding high or low excitation currents to a first of said plural output means and having current return means in common with said trigger circuit means,
   impedance means,
   second diode means having a gate control electrode,
   said impedance means and said second diode means being coupled in series relation between said first of said input means and said current return means,
   sensor impedance means sensing the amplitude of said excitation current for developing a corresponding sensor voltage thereacross, and
   network means coupling said sensor voltage to said gate control electrode whereby, only in the presence of said high excitation current and of a fault event causing said sensor voltage to increase above a predetermined level, said second diode latches in its conducting state, latching said amplifier means in its non-conducting state and protecting said amplifier means from destruction because of said fault event.

2. Apparatus as described in claim 1 wherein said trigger circuit means comprises:
   regenerative comparator means responsive to a first of said plural output means and to a predetermined reference voltage level, and
   transistor amplifier means responsive to the output of said regenerative comparator means.

3. Apparatus as described in claim 1 further including alarm means inductively coupled to said impedance means.

4. Apparatus as described in claim 1 additionally comprising:
   pulse transformer means having primary and secondary windings,
   said primary winding serving as said impedance means, and
   alarm means,
   said secondary winding being coupled between said common current return means and said alarm means for supplying an actuating impulse of current to said alarm means at the onset of a fault event.

5. Apparatus as described in claim 4 wherein said alarm means comprises:
   third diode means having a gate control electrode,
   alarm display means,
   said third diode means and said alarm display means being coupled in series between said common current return means and means for supplying an alarm excitation voltage,
   said gate control electrode of said third diode means being coupled to said secondary winding whereby said alarm display means is actuated in latched condition at the onset of a fault event in the presence of said high excitation current.

6. Apparatus as described in claim 5 additionally including switch means coupled in series relation with said alarm display means for removing said alarm excitation voltage and resetting said third diode means to its non-conducting state.

7. Apparatus as described in claim 5 further including second capacitor means coupled in shunt across said third diode means and said alarm means for rendering operation of said third diode means substantially insensitive to noise impulses.

8. Apparatus wherein each of said plural data processing channels includes pulse transformer means as described in Claim 4, said several pulse transformer secondary windings being coupled in series relation between said common current return means and said alarm means.

9. Apparatus as described in claim 1 further including first capacitor means coupled between said second diode means gate control electrode and said current return means for rendering operation of said second diode means substantially insensitive to noise impulses.

* * * * *